US012032338B2

(12) United States Patent
Shiratori et al.

(10) Patent No.: US 12,032,338 B2
(45) Date of Patent: Jul. 9, 2024

(54) POINTER DISPLAY APPARATUS AND POINTER OPERATION CONTROL METHOD

(71) Applicant: CASIO COMPUTER CO., LTD., Tokyo (JP)

(72) Inventors: Chiharu Shiratori, Ome (JP); Shuto Oikawa, Tachikawa (JP); Tomoki Ishikawa, Ome (JP); Hitoshi Tanaka, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 570 days.

(21) Appl. No.: 17/176,323

(22) Filed: Feb. 16, 2021

(65) Prior Publication Data

US 2021/0263476 A1 Aug. 26, 2021

(30) Foreign Application Priority Data

Feb. 25, 2020 (JP) ................................ 2020-029160

(51) Int. Cl.
*G04C 17/00* (2006.01)
*G04B 19/04* (2006.01)

(52) U.S. Cl.
CPC ....... *G04C 17/0091* (2013.01); *G04B 19/048* (2013.01)

(58) Field of Classification Search
CPC .......................... G04C 17/0091; G04B 19/048
See application file for complete search history.

(56) References Cited

U.S. PATENT DOCUMENTS

| | | | | |
|---|---|---|---|---|
| 3,475,902 A | 11/1969 | Wessel | | |
| 2006/0203617 A1* | 9/2006 | Matthey | G04G 21/02 | 368/11 |
| 2007/0025186 A1 | 2/2007 | Gilomen | | |
| 2013/0051189 A1* | 2/2013 | Springer | G04G 9/0082 | 368/69 |
| 2017/0075305 A1* | 3/2017 | Ryu | G04G 9/0064 | |
| 2017/0082983 A1* | 3/2017 | Katzer | G04B 47/066 | |

(Continued)

FOREIGN PATENT DOCUMENTS

| | | |
|---|---|---|
| CN | 106550106 A | 3/2017 |
| JP | S4727962 Y | 8/1972 |
| JP | H05-006393 U | 1/1993 |

(Continued)

OTHER PUBLICATIONS

Extended European Search Report dated Jul. 5, 2021 received in European Patent Application No. EP 21153744.4.

(Continued)

*Primary Examiner* — Edwin A. Leon
*Assistant Examiner* — Kevin Andrew Johnston
(74) *Attorney, Agent, or Firm* — Scully, Scott, Murphy & Presser, P.C.

(57) ABSTRACT

A pointer display apparatus includes a pointer which operates in an operation range; and at least one processor which controls an operation of the pointer. In a first display mode in which the processor displays display contents with the pointer, the processor sets an evacuation state of the pointer in an evacuation operation in which the pointer is temporarily evacuated from a pointing range to be different from an evacuation state of the pointer in a mode other than the first display mode.

8 Claims, 6 Drawing Sheets

(56) References Cited

U.S. PATENT DOCUMENTS

2017/0115632 A1* 4/2017 Matsuno .............. G04B 47/068

FOREIGN PATENT DOCUMENTS

| | | | | | |
|---|---|---|---|---|---|
| JP | H06-273545 | A | | 9/1994 | |
| JP | 2000131469 | A | | 5/2000 | |
| JP | 2006-275948 | A | | 10/2006 | |
| JP | 2015-148628 | A | | 8/2015 | |
| JP | 2015148628 | A | * | 8/2015 | ............. G04B 13/02 |
| JP | 2017-058335 | A | | 3/2017 | |
| JP | 2018116042 | A | | 7/2018 | |

OTHER PUBLICATIONS

Notice of Reasons for Refusal dated Apr. 5, 2022 received in Japanese Patent Application No. JP 2020-029160 together with an English language translation.

First Office Action dated Mar. 7, 2022 received in Chinese Patent Application No. CN 202110203919.0 together with an English language translation.

Notice of Reasons for Refusal dated Nov. 21, 2023 received in Japanese Patent Application No. JP 2022-084214.

* cited by examiner

POINTER DISPLAY APPARATUS AND POINTER OPERATION CONTROL METHOD

CROSS-REFERENCE TO RELATED APPLICATION

This application is based upon and claims the benefit of priority from the prior Japanese Patent Application No. 2020-029160, filed on Feb. 25, 2020, the entire contents of which are incorporated herein by reference.

BACKGROUND

Technical Field

The present disclosure relates to a pointer display apparatus and a pointer operation control method.

Background Art

For example, JP H6-273545 discloses a technique to temporarily evacuate the pointer positioned overlapped in the display range so that the display in the display range can be viewed.

SUMMARY

According to a present embodiment, a pointer display apparatus includes: a pointer which operates in an operation range; and at least one processor which controls an operation of the pointer, wherein, in a first display mode in which the processor displays display contents with the pointer, the processor sets an evacuation state of the pointer in an evacuation operation in which the pointer is temporarily evacuated from a pointing range to be different from an evacuation state of the pointer in a mode other than the first display mode.

DETAILED DESCRIPTION OF THE PREFERRED EMBODIMENTS

The embodiments are described with reference to the drawings.

Figure 1:
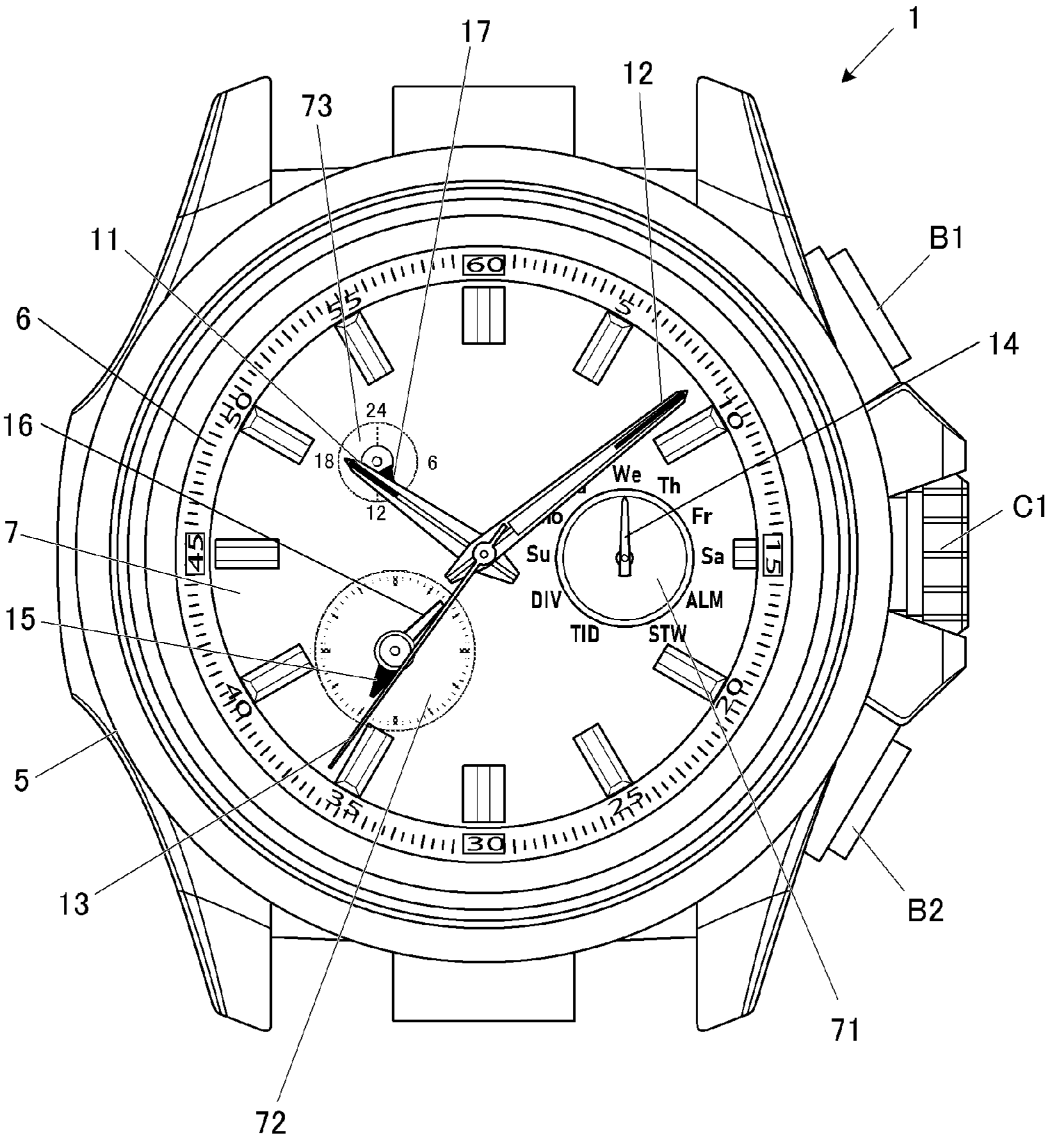
FIG. 1 is a front view of an electronic watch which is a pointer display apparatus according to the present embodiment.

FIG. 1 is a front view of an electronic watch 1 which is a pointer display apparatus according to the present embodiment.

The electronic watch 1 includes a case 5, a display screen 6 positioned in the center of the case 5, and press button switches B1 and B2 and a crown Cl positioned on the side of the case 5.

The case 5 includes a cylinder open at the top and the bottom. The bottom of the case 5 is sealed with a bottom cover (not shown). A display plate 7 and an optically transparent (normally transparent) windshield glass (not shown) which covers the upper surface of the display plate 7 are positioned on the top of the case 5. A control substrate, a driving mechanism to operate the pointers and a battery (which are not shown) are positioned between the bottom cover and the display plate 7.

Indexes and scales to show the time are aligned with spaces in between in the circumferential edge of the display plate 7. The display plate 7 includes a small window 71 in a direction in which the index shows three o'clock, a small window 72 in a direction in which the index shows seven-thirty, and a small window 73 in a direction in which the index shows ten-thirty.

The following are aligned between the display plate 7 and the windshield glass. An hour hand 11 (first pointer), a minute hand 12 (second pointer), and a second hand 13 (third pointer) (collectively referred as a plurality of pointers) rotate (operate within a display range) around the substantial center of the display plate 7 as the rotating axis. A function pointer 14 rotates around the substantial center of the small window 71 as the rotating axis. A small hour hand 15 and a small minute hand 16 rotate around the substantial center of the small window 72 as the rotating axis. A 24-hour hand 17 rotates around the substantial center of the small window 73 as the rotating axis. Hereinbelow, some or all of the hour hand 11, the minute hand 12, the second hand 13, the function pointer 14, the small hour hand 15, the small minute hand 16, and the 24-hour hand 17 may be collectively referred as the pointers 11 to 17.

Normally, the hour hand 11, the minute hand 12, and the second hand 13 display the present time of the present place (also called base time) (example of time display mode, second display mode). In the display of the present time, the hour hand 11, the minute hand 12, and the second hand 13 each display the hour, minute, and the second (display different unit amount). In the stopwatch operation, that is, when the elapsed time is measured, similarly, the time, minute, and second of the elapsed time can be displayed, or the minute, second, and less than one second can be displayed. Although not limited, according to the electronic timepiece 1, the second hand 13 is narrowest and the hour hand 11 is widest among the pointers 11 to 13.

Seven indexes each showing the day of the week and indexes showing the function mode (here, four) are aligned in the circumferential edge of the small window 71. In the present time display, the function pointer 14 points to one of the day indexes to show the present day of the week. The indexes showing the function mode include, for example, "ALM", "STW", "TID", "DIV", and the like, and each respectively show, an alarm notification operation at a set time, stop watch operation which measures elapsed time, display operation showing the state of the tide, and a diving time measuring operation which measures the elapsed time during diving. When any of the above functions is executed, the functional pointer 14 indicates the index showing the function being executed.

Indexes corresponding to the display of the time are aligned around the circumferential edge of the small window 72. When the pointers 11 to 13 display the present time, the small hour hand 15 and the small minute hand 16 display a world clock function, for example. When other functions are being executed, the time and minute of the present time are displayed. The world clock function is a function which displays the present time (local time) of a time zone set in advance (the setting may be a city corresponding to each time zone). The setting of the time zone or city can be performed by providing indexes of cities or time differences on the circumferential edge of the display screen 6 and the pointer such as the second hand 13 can be used to indicate the time zone or the city to be set.

Indexes showing twenty four hours are aligned in the circumferential edge of the small window 73, and the 24-hour hand 17 shows the present time in a 24-hour display. The 24-hour hand 17 may display time longer than the hour hand 11 in the stopwatch operation and the diving time measuring operation.

The press button switches B1 and B2 and the crown Cl are structures provided in an operation receiver 47 (see FIG. 2) to receive the input operation from outside. The press button switches B1 and B2 output an electric signal according to the pressed operation. The crown Cl can be pulled out, pressed back and rotated, and an electric signal is output according to the type of operation. The crown Cl can be a structure which can be rotated only when the crown Cl is pulled out from the initial position.

Figure 2:
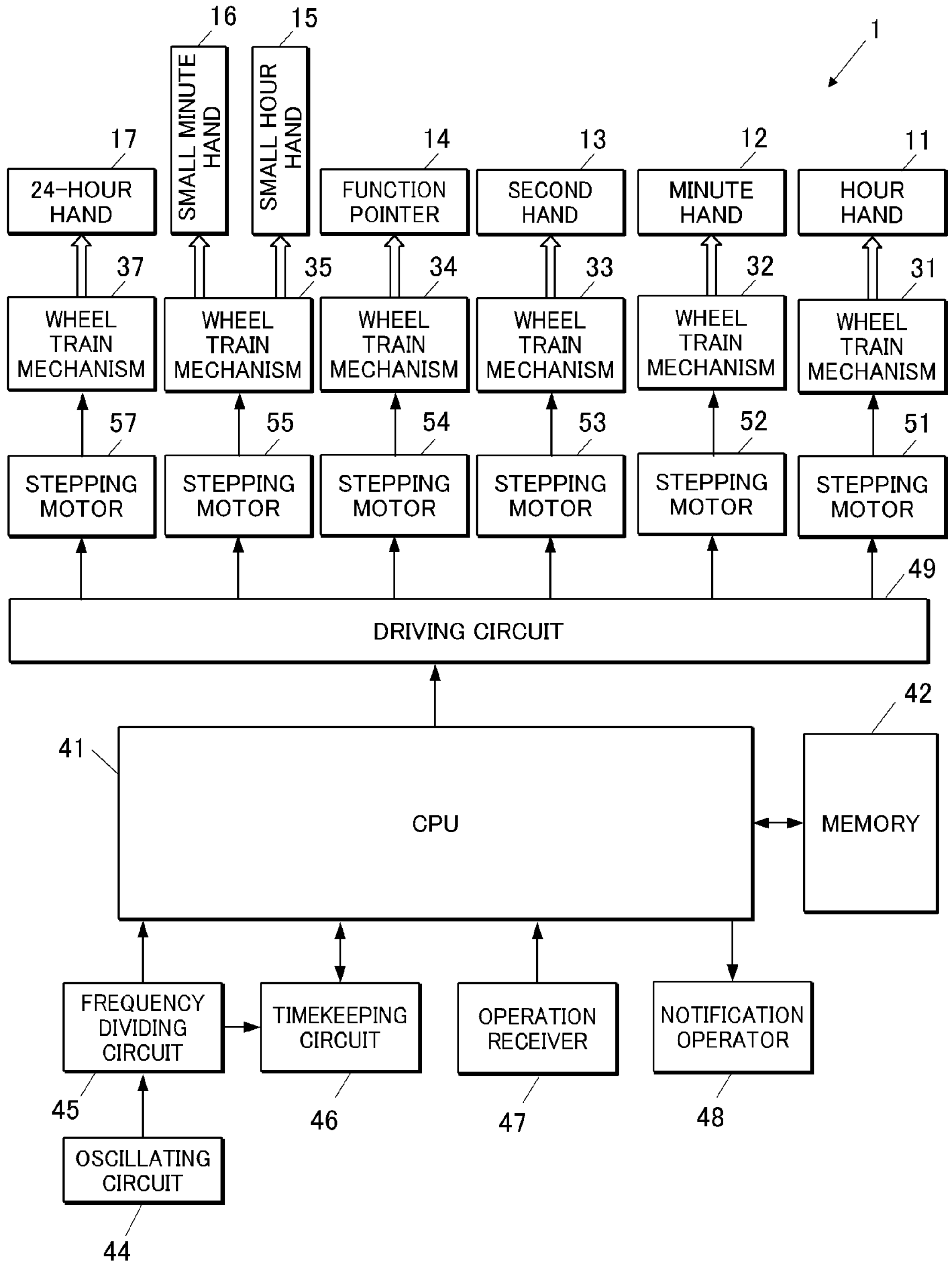
FIG. 2 is a block diagram showing a functional configuration of an electronic watch.

FIG. 2 is a block diagram showing a functional configuration of the electronic watch 1.

In addition to the hour hand 11, the minute hand 12, the second hand 13, the function pointer 14, the small hour hand 15, the small minute hand 16, and the 24-hour hand 17, the electronic watch 1 includes a CPU 41 (Central Processing Unit) (processor), a memory 42, an oscillating circuit 44, a frequency dividing circuit 45, a timekeeping circuit 46 (timekeeper), an operation receiver 47, a notification operator 48, a driving circuit 49, stepping motors 51 to 55, and 57, and wheel train mechanisms 31 to 35, and 37.

The CPU 41 is a processor which performs various calculating processes and which centrally controls the entire operation of the electronic watch 1. In the normal time display state, the CPU 41 displays the time with the pointers 11 to 13 according to the date and time calculated by the timekeeper circuit 46 or displays the day of the week with the function pointer 14. The CPU 41 calls and executes a program which performs control according to the various functions which are executed such as the stopwatch function, the alarm notification function, the tide display function, and the diving time measuring function.

The memory 42 stores various data. For example, the memory 42 includes a nonvolatile memory and a volatile RAM (Random Access Memory). Although not limited, the nonvolatile memory is a flash memory and stores the programs and setting data regarding the control of operation of the electronic watch 1. The setting data or the program may include information of evacuation destination position in a later described pointer evacuation operation, data regarding diving time measured in the diving time measuring operation, and data regarding water surface resting time determined for a maximum depth. The RAM provides a work memory space in the CPU 41 and stores temporary data and updatable setting data. Rewritable data includes data regarding a plan table which stores one or a plurality of plans of whether the alarm notification is performed and the time that the alarm notification is performed.

One or all of the CPU 41 and the memory 42 can be formed and positioned on a single IC chip (control substrate, microcomputer).

The oscillating circuit 44 generates a frequency signal and outputs the signal to the frequency dividing circuit 45. For example, a crystal oscillator is used in the oscillating circuit 44.

The frequency dividing circuit 45 divides the frequency signal input from the oscillating circuit 44, and converts and outputs the signal to a frequency signal (clock signal) used in the operation by the CPU 41, etc. The frequency to which the signal is converted can be changed according to a control instruction from the CPU 41.

The timekeeping circuit 46 counts and holds the present date/time (at least time) based on the clock signal input from the frequency dividing circuit 45. The date and time held by the timekeeping circuit 46 can be counted by numerals in a format specific to the electronic watch 1 or the date and time as the reference such as the UTC date/time can be held in the form of year/month/date/hour/minute/second. The date and time counting operation of the timekeeping circuit 46 can be substantially performed by the CPU 41.

The operation receiver 47 detects a pressed state of the press button switches B1 and B2, and pull out operation, rotating operation, and press back operation of the crown Cl. The detection is converted to an electric signal and the signal is output to the CPU 41.

The notification operator 48 performs a notification operation to a user according to a control signal from the CPU 41. The notification operator 48 includes a beep sound outputting unit which generates a beep sound and a vibration generating unit which generates a vibration. A well-known configuration such as a piezoelectric element and a motor with a weight can be used as the beep sound outputting unit and the vibration generating unit, respectively.

The driving circuit 49 drives each of the stepping motors 51 to 55 and 57 according to the control signal input from the CPU 41, and a driving voltage pulse to perform a step operation in which the rotor rotates at an angle with relation to the stator is output at a suitable timing and pulse width. The driving voltage pulse width can be suitably adjusted by the control signal from the CPU 41. The driving circuit 49 can be suitably controlled by the control signal from the CPU 41. The driving circuit 49 can suitably control the driving timing of the plurality of stepping motors 51 to 55 and 57.

The stepping motor 51 rotates the hour hand 11 through the wheel train mechanism 31 which is a combination of gears. For example, one rotation is made by one step operation of the stepping motor 51. With this, it is shown that 2 minutes passed on a BT display.

The stepping motor 52 rotates the minute hand 12 through the wheel train mechanism 32. For example, one rotation is made by one step operation of the stepping motor 52. With this, it is shown that 10 seconds passed on the BT display.

The stepping motors 51 and 52 are not limited but may be configured to be able to fast forward at the same speed in a forward direction (clockwise) and a reverse direction (counter clockwise).

The stepping motor 53 rotates the second hand 13 through the wheel train mechanism 33. For example, six rotations are made by one step operation of the stepping motor 53. With this, it is shown that one second passed on the BT display.

The stepping motor 54 rotates the function pointer 14 through the wheel train mechanism 34. For example, one rotation is made by one step operation of the stepping motor 54.

The stepping motor 55 rotates the small hour hand 15 and the small minute hand 16 together through the wheel train mechanism 35. For example, the small minute hand 16 rotates once and the small hour hand 15 rotates 1/12 times by one step operation of the stepping motor 55. With this, the small hour hand 15 rotates 30 degrees while the small minute hand 16 rotates 360 degrees and it is possible to display that one hour passed.

The stepping motor 57 rotates the 24-hour hand 17 through the wheel train mechanism 37. For example, the 24-hour hand 17 rotates once by one step operation of the stepping motor 57. That is, in the BT display, one step operation is performed every 4 minutes and the 24-hour hand 17 rotates one cycle in 24 hours.

The electronic watch 1 includes a measuring unit including a sensor which measures water depth (water pressure), direction (magnetic north) and gravity direction, and an illuminator which illuminates the display screen 6.

Next, the diving time measuring function (first display mode) is described.

Figure 3:
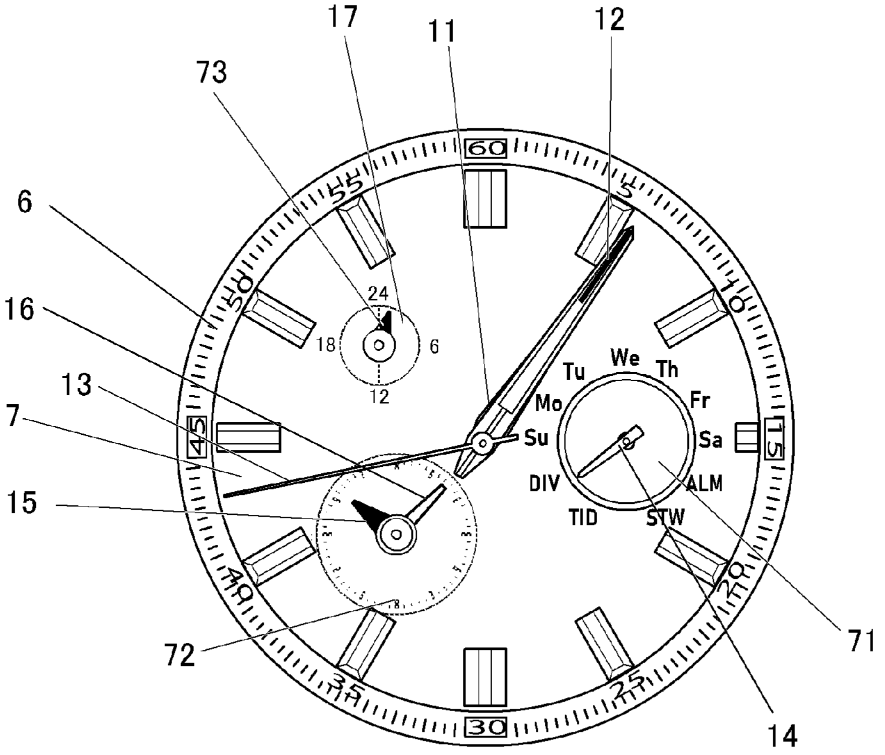
FIG. 3 is a diagram showing a display example of measured time during diving.

FIG. 3 is a diagram showing an example of a display showing the time measured during diving.

When the watch is used during diving, there are various characteristics such as visibility worsening compared to viewing the display when the stopwatch function is executed under normal circumstances, the measured time does not become drastically long (no longer than one or two hours), and there is no demand for accuracy of less than one second. In view of the above features, the electronic watch 1 displays the minutes and seconds which pass using the minute hand 12 and the second hand 13 and displays the amount of time that diving is continued (display regarding display contents) by synchronizing the hour hand 11 with the minute hand 12 so that the hour hand 11 and the minute hand 12 point the same position. With this, even if the visibility is low, the user is able to visually confirm the amount of time that passed (elapsed time) in a secure way, within a short time, and without mistake according to the direction which is pointed by both the hour hand 11 and the minute hand 12. Here, the 24-hour hand 17 shows two hours with one lap so that the time can be measured for diving which continues for one hour or more.

According to the example shown in FIG. 3, the function pointer 14 points to the index "DIV" and shows that the diving time measuring function is being executed. When the present measuring time is 5 minutes and 43 seconds, both the hour hand 11 and the minute hand 12 point in the direction of 5 minutes and 40 seconds. In addition, the second hand points to 43 seconds. The 24-hour hand 17 is positioned between 0 hours to 6 hours, and it is possible to understand that one hour passed. The small hour hand 15 and the small minute hand 16 switch to displaying the present time at the present position on the small window 72.

In the diving time measuring function, not only is the diving time measured but it is also possible to switch to measuring the water surface resting time between diving and after diving in response to operating the press button switches B1 and B2.

Next, the evacuation operation of the pointers 11 to 13 is described.

The display of the pointers 14 to 17 in the small windows 71 to 73 on the display plate 7 is performed below the pointers 11 to 13, and therefore, the contents pointed by the pointers 14 to 17 may be difficult to view depending on the position of the pointers 11 to 13. According to the electronic watch 1, if the user would like to view the contents pointed by the pointers 14 to 17, especially the pointers 15 and 16, some or all of the pointers 11 to 13 can be evacuated from the display position temporarily (for example, a few seconds to 10 seconds) in response to receiving an operation on the operation receiver 47.

Figure 4A:
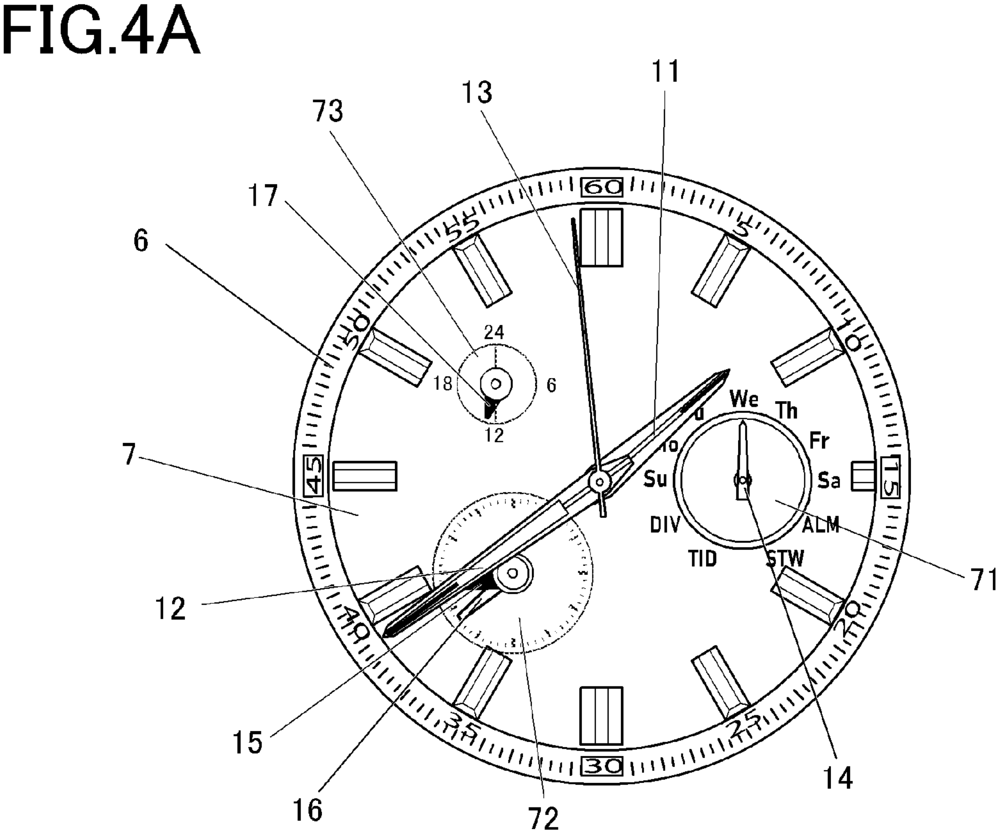
FIG. 4A is a diagram describing an example of the pointer evacuation.
Figure 4B:
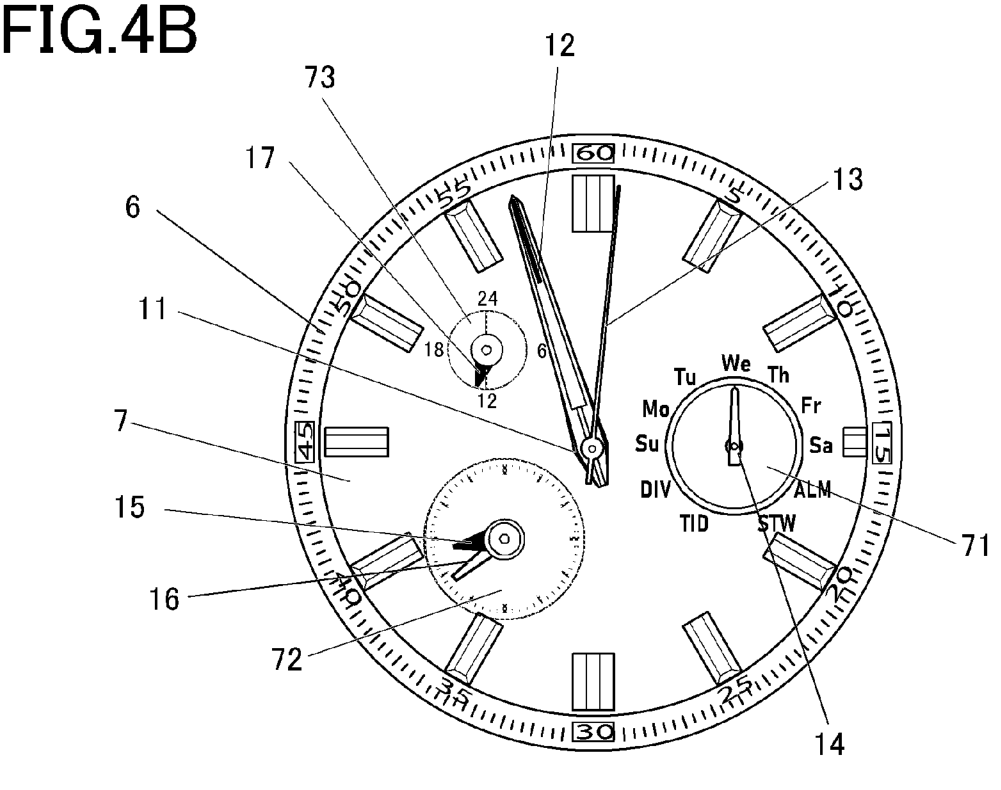
FIG. 4B is a diagram describing an example of the pointer evacuation.

FIG. 4A and FIG. 4B are diagrams describing an example of the evacuation of the pointer.

In FIG. 4A, the minute hand 12 is overlapped with the small window 72 in the middle of the display of the present time, and the display of the world time by the small hour hand 15 and the small minute hand 16 is difficult to view. In this case, the hour hand 11 and the minute hand 12 can be temporarily evacuated from above the small windows 71 to 73 (pointing range). The range in which the pointers 11 and 12 need to be evacuated and the range or the position whether the pointers 11 and 12 are evacuated can be determined in advance. Here, the direction showing 27 minutes and the position showing 57 minutes can be determined to be the positions as destinations of evacuation (specific position). For example, the hour hand 11 and the minute hand 12 can be evacuated to the position where the total or the maximum amount of the moving time or the moving steps becomes smaller.

In FIG. 4B, the hour hand 11 and the minute hand 12 are evacuated in the direction of 57 minutes, and the small window 72, the small hour hand 15, and the small minute hand 16 can be viewed more easily. Here, the second hand 13 can continue to display seconds as normal. Typically, the second hand 13 is thin and quickly passes the target small window. Therefore, the second hand 13 usually does not interfere with the field of view. That is, in this case, the evacuation operation is performed by only the pointers 11 and 12 which are some of the plurality of pointers 11 to 13.

Figure 5A:
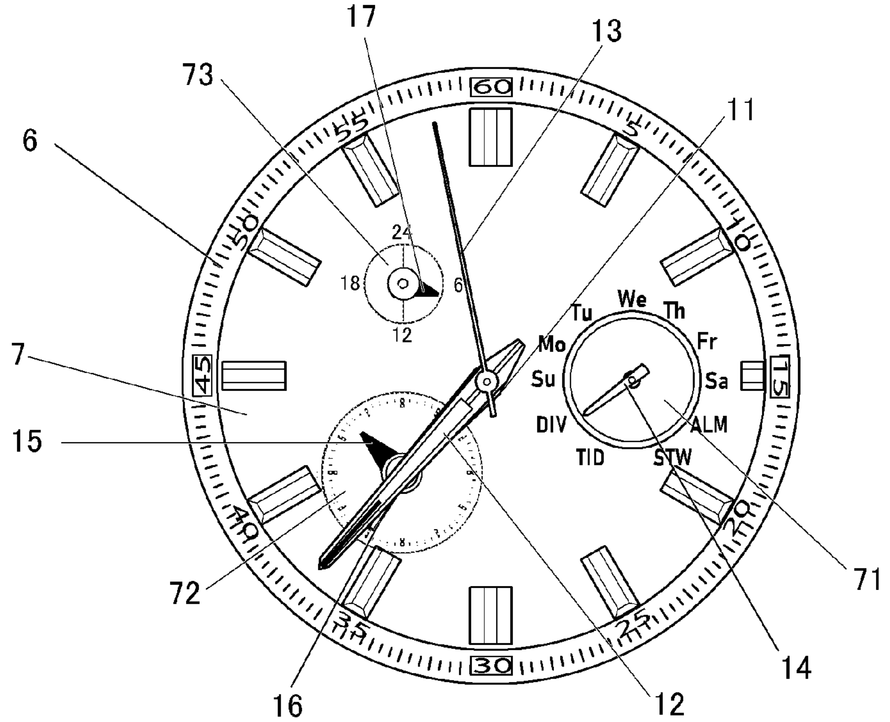
FIG. 5A is a diagram showing an example of evacuation while a diving time measuring function is being executed.
Figure 5B:
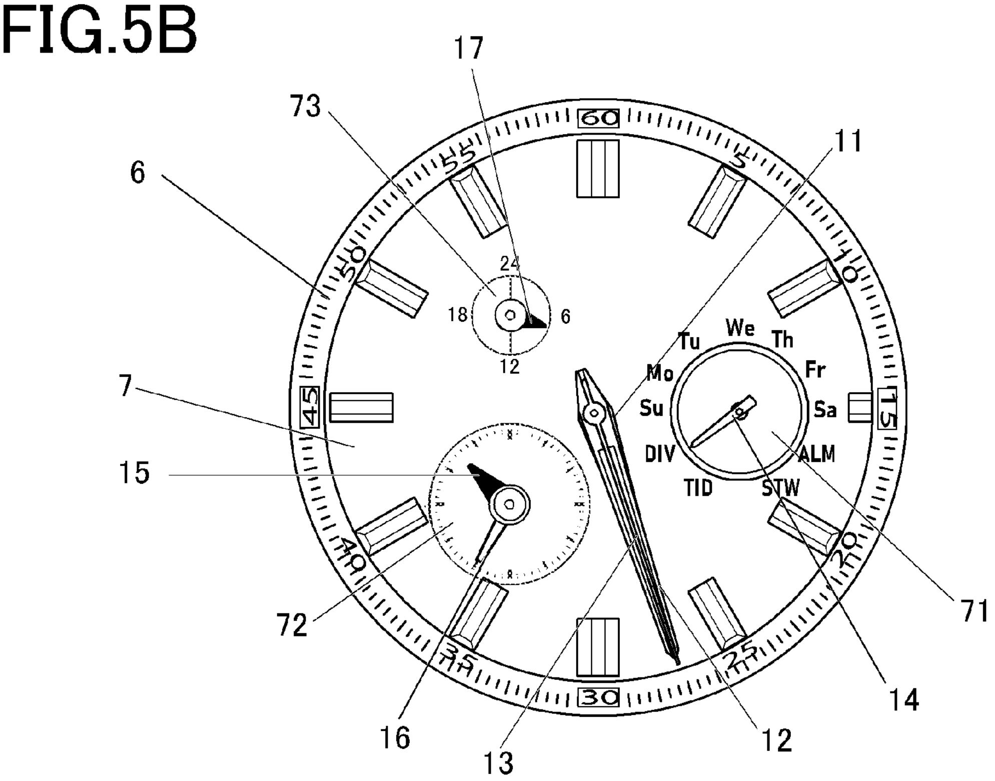
FIG. 5B is a diagram showing an example of evacuation while a diving time measuring function is being executed.

FIG. 5A and FIG. 5B are diagrams showing examples of evacuation performed while the diving time measuring function is being executed.

As shown in FIG. 5A, even while the diving time measuring function is being executed, the hour hand 11 and the minute hand 12 may be positioned above the small window display, here, above the display of the small hour hand 15 and the small minute hand 16 in the small window 72.

In this case, the positions of the hour hand 11 and the minute hand 12 are matched from the beginning, and it is not possible to discriminate between whether the hour hand 11 and the minute hand 12 are evacuated to a specific position or are in a normal measuring state. Therefore, when the evacuation operation is performed while the diving time measuring function is being executed, the evacuation state is shown differently from the display of the present time (first display mode). Here, not only the hour hand 11 and the minute hand 12 but also the second hand 13 is evacuated to the same position (specific position).

As shown in FIG. 5B, here, the hour hand 11, the minute hand 12, and the second hand 13 are all evacuated to the position of 27 minutes. With this, the user is able to quickly understand that the pointer evacuation process is performed during the diving time measuring operation. The evacuation destination position can be a position pointing in a direction which cannot be seen when the time is displayed normally. When the operation of returning to zero in which the pointers 11 to 13 are all aligned in the 0 hour direction has a different meaning (for example, power shortage of the battery), the 0 hour direction can be excluded from the evacuation direction.

Figure 6:
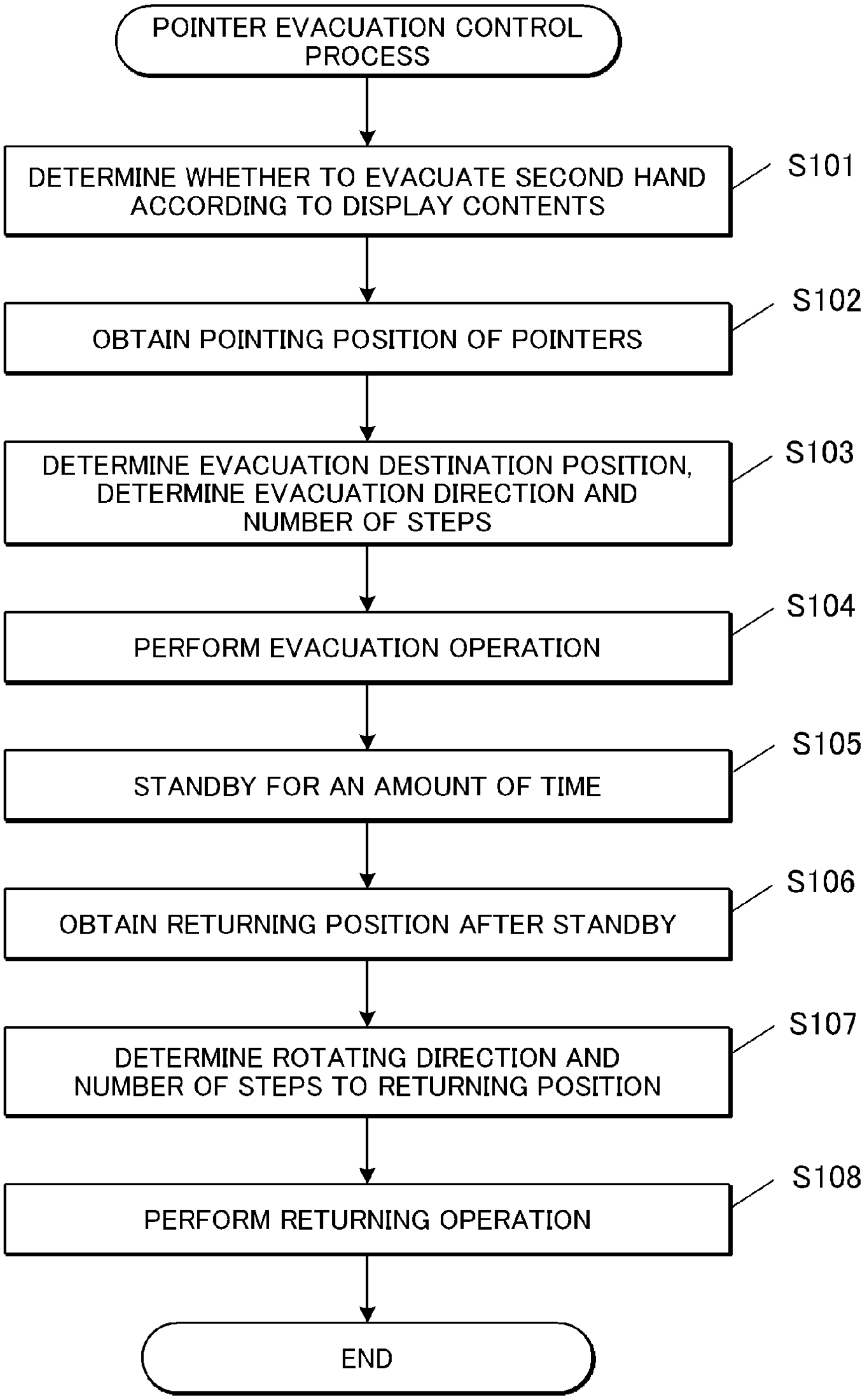
FIG. 6 is a flowchart showing a control procedure of a pointer evacuation control process executed by the electronic watch.

FIG. 6 is a flowchart showing a control procedure by the CPU 41 in a pointer evacuation control process executed by the electronic watch 1 according to the present embodiment.

Such pointer evacuation control process is started when the operation receiver 47 receives an input operation and the instruction to evacuate the pointers in the operation modes is received.

When the pointer evacuation control process is started, the CPU 41 determines whether to evacuate the second hand 13 according to the displayed contents (step S101). The CPU 41 obtains the position which is pointed at present by the pointer as the evacuation target (step S102).

The CPU 41 determines the evacuation destination position and determines the evacuation rotating direction and the number of steps from the present position of the pointers to be evacuated (step S103). The evacuation destination position can be changed according to the display mode. For example, in the small window 71, the day of the week and the function being executed are displayed. However, there is no need to confirm the function being executed during actual use, and the setting can be set so that the pointers 11 to 13 are not evacuated from the small window 71 other than displaying the present date and time. According to the above determination, the CPU 41 outputs the control signal to the driving circuit 49 and executes the evacuation operation to fast forward the pointers in the evacuation rotating direction and in the number of steps determined above (step S104).

The CPU 41 stands by for an amount of time after finishing the evacuation operation (step S105). The end of the evacuation operation can be determined by standby for the amount of time or by receiving an input operation on the operation receiver 47. The CPU 41 obtains a returning position where the pointers are planned to return after the evacuation ends (step S106). The CPU 41 determines the rotating direction and the number of steps of movement for the pointers to move from the present evacuation destination position to the planned returning position (step S107). The process in steps S106 and S107 can be performed before the amount of time passes in the process in step S105. When the returning position changes due to the timing of return shifting after the input operation is received, the CPU 41 can redo the process in steps S106 and S107.

The CPU 41 outputs the control signal to the driving circuit 49 and the evacuated pointers are moved fast forward to the returning position (step S108). Then, the CPU 41 ends the pointer evacuation control process.

As described above, the electronic watch 1 according to the present embodiment includes pointers such as an hour hand 11, a minute hand 12, and a second hand 13, and a CPU 41 which controls the operation of the pointers 11 to 13. In the evacuation operation in which the pointers 11 and 12 are temporarily evacuated from the pointing range such as the range overlapped with the small windows 71 to 73, when the display contents are displayed by the pointers 11 to 13 such as when the diving time measuring function in which display of the continuing time of diving is performed, the CPU 41 evacuates the pointers 11 to 13 in the evacuation state different from when the pointers 11 to 13 are evacuated in functions other than the diving time measuring function.

For example, JP H6-273545 describes a technique in which the pointers positioned overlapped in the display range are temporarily evacuated from the display range and the display in the display range becomes visible. However, in the pointer display apparatus in which various types of information can be displayed by switching, there is a problem that if the operation to evacuate the pointers from the display range is performed uniformly without considering the features of the display content, it is not easy to discriminate whether the pointers are evacuated or whether normal/abnormal display is performed.

That is, according to the electronic watch 1 of the present embodiment, the evacuation state is suitably differed according to the pointer operation, and with this, the user is able to easily discriminate from the display state whether the pointers are evacuated, whether normal display is performed, or whether an abnormal display is performed.

The electronic watch 1 includes a plurality of pointers 11 to 13 and the evacuation state includes some of the plurality of pointers 11 to 13, for example, when only the pointers 11 and 12 are evacuated. That is, when some of the pointers such as the second hand 13 does not interfere with the confirmation of the display below the pointer, there is no need to move the pointer more than necessary and there is no need to increase the consumption of time and power. Moreover, it may be easier for the user to understand to continue the display with some of the pointers instead of performing the normal evacuation operation. Therefore, the display can be more suitably understood by not uniformly evacuating all of the pointers 11 to 13.

When the diving time measuring function is being executed, the CPU 41 evacuates each of the pointers 11 to 13 to a specific position. Normally, the second hand 13 which hardly interferes with other displays is also evacuated to the specific position so that it is possible to clearly discriminate the evacuation state from the normal display state in the diving time measuring function in which the hour hand 11 and the minute hand 12 are synchronized and moved. The other displays can be viewed more clearly underwater.

The specific positions for the pointers 11 to 13 are the same. That is, the three pointers 11 to 13 are evacuated to the same position. With this, the user is able to easily understand that the pointers 11 to 13 are performing a special operation. Specifically, the user is able to easily understand that the display made a normal switch from the display in which the hour hand 11 and the minute hand 12 are overlapped to the evacuation state.

The plurality of pointers 11 to 13 include an hour hand 11, a minute hand 12, and a second hand 13. When the diving time measuring function is performed, the hour hand 11 and the minute hand 12 are synchronized to the same position and point the same position.

That is, a special display operation in which the hour hand 11 and the minute hand 12 are synchronized to point to the same position is performed in the diving time measuring function. Therefore, the evacuation operation different from normal is set in the evacuation operation to expose the display hidden by the pointers 11 to 13. With this, it is possible to clearly show that the operation of the pointers 11 to 13 is not abnormal and normal evacuation operation is performed. Specifically, in a situation such as underwater in which the field of view is limited and the user does not want to consume more time than necessary to confirm the display screen, the user is able to understand immediately that the pointers 11 to 13 are evacuating normally.

In the diving time measuring function, the CPU 41 displays the elapsed time with the direction pointed by both the hour hand 11 and the minute hand 12. With this, when the measurement of a long amount of time is not assumed and the display by the hour hand 11 in the unit of one hour is not important, the measured time in the unit of one minute can be displayed in a state which is easy to view.

In a second display mode different from the diving time measuring function such as the normal display operation showing the present time, the CPU 41 controls the hour hand 11 and the minute hand 12 so that each pointer displays a different unit amount. That is, in this case, the display of the evacuation state is easy to understand by moving only the hour hand 11 and the minute hand 12 to the evacuation position. On the other hand, the evacuation operation of the second hand 13 is added in the diving time measuring function to display the evacuation state differently. Due to the above, the user is able to easily understand the evacuation state for the normal display state.

In the second display mode, the CPU 41 may continue the display by the second hand 13 without evacuating the second hand 13.

By continuing the operation by the pointer 13, the user is able to understand that in the usual state, the pointing operation is not abnormal and the hour hand 11 and the minute hand 12 are temporarily moved to the evacuation destination position with an intention. Specifically, the second hand 13 is thin and the visibility of the other displays is not interfered even if the second hand 13 is not evacuated. In the evacuation operation, normally, the other displays are often viewed in a state in which the user already knows the contents of display by the pointers 11 to 13. Therefore, it is not a problem to pause the operation of the hour hand 11 and the minute hand 12 but seconds pass even during the evacuation operation so the minimum required information can be continuously provided to the user.

The pointing range which is the evacuation target is the range in which the display operation is performed by components other than the pointers 11 to 13, and here, it is the range of the small windows 71 to 73. The pointing range can be changed according to the display mode. If the evacuation destination position is limited to a uniform and small position, it is easy to show that the state is in the evacuation state, but the time necessary to perform the evacuation operation according to the situation may become long. Therefore, since the evacuation operation amount is not set to be larger than necessary, the amount of time for evacuation is not set to be an amount longer than necessary, and the normal display is quickly restored after the information which the user needs is temporarily set to be easy to view.

An electronic apparatus 100 includes a timekeeping circuit 46 which counts the present time. The CPU 41 controls the pointers 11 to 13 to display the present time counted by the timekeeping circuit 46 when the present time is displayed as the normal operation. That is, the electronic apparatus 100 can be an electronic watch. In the electronic watch which displays various functions, the display of the present time which is initially important may interfere with other displays. By controlling the pointers 11 to 13 which display the time so as to be able to suitably evacuate according to the display contents, a lot of contents can be displayed effectively on the compact display screen 6, and the user is able to easily view the display contents.

A pointer operation control method according to the present embodiment includes an evacuation setting step. According to the evacuation setting step, in the diving time measuring function in which the pointers 11 to 13 display contents such as the continuing time of diving, the evacuation state of the pointers 11 to 13 executing the evacuation operation to temporarily evacuate the pointers 11 and 12 from the pointing range is different from the evacuation state of the pointers 11 to 13 executing the function other than the diving time measuring function.

With this, it is possible to understand that the pointers are evacuated flexibly and clearly according to the operation state of the pointers 11 to 13 operating according to the function being executed. Therefore, the user is able to easily discriminate whether the display state of the pointer is normal or abnormal. Specifically, the user is able to quickly understand that the evacuation of the pointers 11 to 13 is performed normally in a situation in which the user is underwater and the field of view is limited and the user does not want to use more time than necessary to confirm the display screen.

The present invention is not limited to the above embodiments, and various modifications are possible.

For example, according to the present embodiment, the diving time measuring operation is described as the hour hand 11 and the minute hand 12 synchronized to be overlapped and moved, but other two pointers such as the minute hand 12 and the second hand 13 can be synchronized to be overlapped and moved.

According to the present embodiment, the display screen 6 includes three small windows 71 to 73 and it is assumed that these small windows 71 to 73 are hidden by the operation of the pointers 11 to 13. However, the display in the small windows can be a digital display using a small display screen. The number of small windows is not limited to three and can be four or more or two. The small window is not limited to a circular shape. For example, the small window can be a half circle shape or an arch with an angle range. Alternatively, the shape can be a rectangular shape. The position of the small window and the size is not limited within the range where evacuation is possible.

According to the above embodiments, the pointers are evacuated from the range of the small windows 71 to 73, but the present invention is not limited to evacuating from all of the small windows 71 to 73. The pointers 11 to 13 may be evacuated from only the small window 72.

The evacuation destination position is not limited to the specific position. The position where the time necessary to suitably evacuate is short can be set as the evacuation destination position within the range where evacuation is possible as long as the pointers 11 to 13 are evacuated from the small windows 71 to 73. All of the evacuation positions of the pointers 11 to 13 do not have to be the same position. The evacuation destination positions can be determined so that the relative relation of the positions among the pointers 11 to 13 is determined in advance to be a relation in which the positions are not the same (for example, aligned in a fixed order with an angle in between each other). Alternatively, the pointers 11 to 13 can each evacuate to the evacuation position closer between the evacuation positions of 27 minutes and 57 minutes.

According to the above-described embodiment, in the normal time display as the operation other than the diving time measuring operation, the second hand 13 continues display. Alternatively, in the other display operations such as when the alarm notification time setting operation is being executed, the display of the on/off setting of the alarm notification by the second hand 13 can be maintained. That is, in this case, the display operation of the second hand 13 is continued but a periodic movement does not occur. In such display state, in order to easily discriminate from the state that the second hand 13 is stopped in the evacuation operation during the diving time measuring operation, the evacuation destination position of the second hand 13 may be determined. The on/off setting display position of the alarm notification operation may be determined in a position which can be easily discriminated from the evacuation destination position of the second hand 13.

Not limited to measuring of the diving time, when the contents to be displayed temporarily becomes less than the number of pointers such as when the direction is displayed by two pointers, the mode can be switched to a display operation mode in which the two pointers are synchronized to display the same position.

According to the present embodiment, in the evacuation state, the pointer stops temporarily at a specific position outside the pointing range but the present embodiment is not limited to the above. The pointer being moved outside the pointing range can continue to move during the evacuation state. For example, the pointer can move back and forth a number of times or an amount of time in a specific range outside the pointing range.

According to the present embodiment, the pointers which are targets of evacuation are three pointers, specifically, the hour hand 11, the minute hand 12, and the second hand 13, but the present embodiment is not limited to the above. The pointers which are targets of evacuation can be four or more. In this case, the number of pointers which may be evacuated is not limited to two or three but can be four or more.

The pointers can be two or less. When the pointers are two, in the evacuation state, the number of pointers which are moved outside the pointing range can be switched between one or two, and the display state of the pointers can be shown in a state which can be easily understood.

When there is one pointer, for example, the patterns in the evacuation state can be different so that the display state of the pointer is clearly shown. The patterns may be the pattern in which the pointer performs a movement outside the pointing range depending on the operation mode, and the pattern in which the pointer points the specific position outside the pointing range. For example, when the pointer points to a certain position before the evacuation operation, the pointer performs the above movement in the evacuation state, and when the pointer is moved periodically, the pointer points to the specific position in the evacuation state. With this, the user is able to easily discriminate the state shifting from the original display state to the evacuation state.

According to the above-described embodiment, the electronic watch 1 is described as the example, but other display apparatuses which perform display using multiple pointers can be used. That is, the display target is not limited to the time of day or the elapsed time. The display may be display of various physical amounts measured by a sensor or values obtained according to such physical amounts or steps determined according to the physical amounts. The values can be determined by the date/time or the present position such as the tide state.

The detailed configuration and the detailed operation according to the present embodiment can be changed without leaving the scope of the present invention.

Although various examples have been shown and described, the scope of the present invention is not limited by the embodiments described above, and the scope of the invention includes the scope of the attached claims and its equivalents.

What is claimed is:

1. A pointer display apparatus comprising:

a plurality of pointers comprising a first pointer and a third pointer which rotate around the same axis in an operation range; and at least one processor which controls an operation of rotation of the first pointer and the third pointer, wherein, in a first display mode in which the processor displays first information on a display, the processor temporarily evacuates both the first pointer and the third pointer from a pointing range and stops the operation of the rotation, wherein, in a second display mode that displays second information different from the first information, the first pointer is evacuated from the pointing range and the operation of the rotation is stopped, and the third pointer is controlled to continue the rotation, wherein the at least one processor evacuates each of the plurality of pointers to a specific position in the first display mode, and wherein the specific position for each of the plurality of pointers is the same position for all of the plurality of pointers.

2. A pointer display apparatus comprising:

a plurality of pointers comprising a first pointer, a second point, and a third pointer which rotate around the same axis in an operation range; and at least one processor which controls an operation of rotation of the first pointer, the second pointer, and the third pointer, wherein, in a first display mode in which the processor displays first information on a display, the processor temporarily evacuates both the first pointer and the third pointer from a pointing range and stops the operation of the rotation, wherein, in a second display mode that displays second information different from the first information, the first pointer is evacuated from the pointing range and the operation of the rotation is stopped, and the third pointer is controlled to continue the rotation, wherein the at least one processor synchronizes the first pointer with the second pointer to point the same position in the first display mode, and wherein the first pointer is an hour hand, the second pointer is a minute hand, and the third pointer is a second hand.

3. The pointer display apparatus according to claim 2, wherein the at least one processor displays elapsed time with a direction pointed by both the first pointer and the second pointer in the first display mode.

4. The pointer display apparatus according to claim 3, wherein the at least one processor controls the first pointer and the second pointer so that each pointer displays a different unit amount in the second display mode.

5. The pointer display apparatus according to claim 1 wherein the pointing range is a range in which the operation of display is performed by a component other than the pointer and the pointing range is changed according to the display mode.

6. The pointer display apparatus according to claim 1, further comprising a timekeeper which counts the present time, wherein, the at least one processor controls the plurality of pointers to display the present time counted by the timekeeper in the second display mode.

7. A method in a pointer display apparatus including a plurality of pointers including a first pointer and a third pointer which rotate around the same axis in an operation range, the method comprising, in a first display mode in which first information is displayed on a display, temporarily evacuating both the first pointer and the third pointer from a pointing range and stopping rotation;

in a second display mode that displays second information different from the first information, evacuating the first pointer from the pointing range and stopping an operation of rotation, and controlling the third pointer to continue the rotation; and evacuating each of the plurality of pointers to a specific position in the first display mode, wherein the specific position for each of the plurality of pointers is the same position for all of the plurality of pointers.

8. A method in a pointer display apparatus including a plurality of pointers including a first pointer, a second pointer, and a third pointer which rotate around the same axis in an operation range, the method comprising, in a first display mode in which first information is displayed on a display, temporarily evacuating both the first pointer and the third pointer from a pointing range and stopping rotation; and in a second display mode that displays second information different from the first information, evacuating the first pointer from the pointing range and stopping an operation of rotation, and controlling the third pointer to continue the rotation; and synchronizing the first pointer with the second pointer to point the same position in the first display mode, wherein, the first pointer is an hour hand, the second pointer is a minute hand, and the third pointer is a second hand.

* * * * *